G. H. Lomax.
Drinking Fountain for Fowls.
N° 69,351. Patented Oct. 1, 1867.
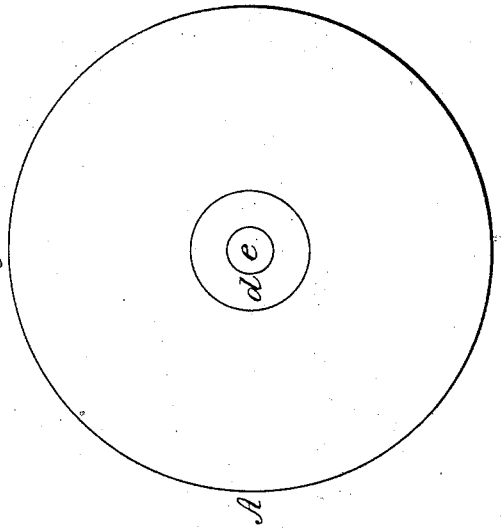
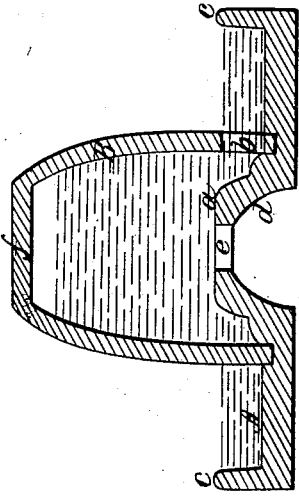
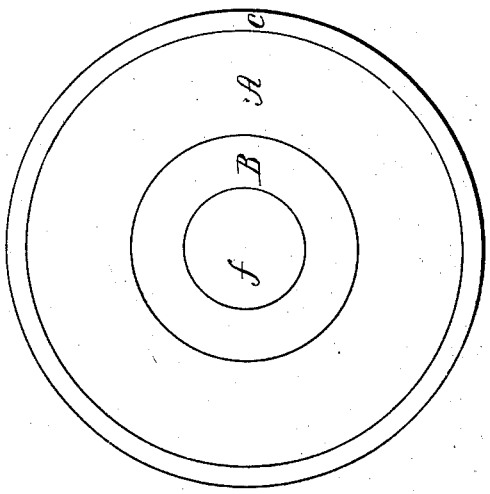
Witnesses.
F. P. Hale Jr
Geo. H. Andrews.
Inventor
George H Lomax.
by his attorney.
R. H. Eddy

United States Patent Office.

GEORGE H. LOMAX, OF SOMERVILLE, MASSACHUSETTS, ASSIGNOR TO HIMSELF AND RICHARD D. BLINN, OF LEXINGTON, MASSACHUSETTS.

Letters Patent No. 69,351, dated October 1, 1867.

IMPROVEMENT IN POULTRY DRINKING-FOUNTAIN.

The Schedule referred to in these Letters Patent and making part of the same.

TO ALL PERSONS TO WHOM THESE PRESENTS SHALL COME:

Be it known that I, GEORGE H. LOMAX, of Somerville, in the county of Middlesex, and State of Massachusetts, have invented a new and useful or improved Poultry Drinking-Fountain; and do hereby declare the same to be fully described in the following specification, and represented in the accompanying drawings, of which—

Figure 1 is a top view,

Figure 2 a bottom view, and

Figure 3 a vertical and transverse section of it, the plane of section being through the water-port or discharging opening.

In these drawings, A denotes a shallow dish or common trough, having a reservoir, B, elevated on its bottom $a$, and concentric with the trough, such reservoir being closed at top, and provided with a water-port or discharging opening, $b$, leading through the lower part of it, and into the trough. The upper edge of this hole should be below the level of the upper edge of the rim $c$ of the trough. The bottom of the trough and reservoir has a semi-spherical or conical chamber, $d$, formed in it, such chamber having a hole, $e$, leading from it into the reservoir. The said chamber $d$ answers two purposes, viz, as a mouth or tunnel to receive water and direct it into the hole $e$, and as a recess for that part of a cork or stopper which, projecting from the hole, is seized by the thumb and finger of a person in order to extract the cork from the hole. The reservoir, when inverted, is to be filled with water through the opening $e$, after which a cork or stopper is to be inserted therein so as to project into the chamber $d$. On turning over the drinking-fountain, the water will run through the opening $b$ into the trough, until it may reach a height therein corresponding to the depth of the orifice $b$. As the water may be drawn from the trough by poultry drinking it therefrom, the amount extracted will be supplied from the reservoir, for as soon as the water in the trough may fall below the level of the top of the orifice $b$, air will pass through the orifice and into the reservoir, and will displace a portion of water sufficient to restore the water in the trough to its proper level. Thus, while the water in the reservoir may be above the level of the top of the opening $b$, the water in the trough will be maintained at a constant or practically constant level.

I am aware that my poultry-fountain is analogous to the "barometer inkstand," that is, it has a reservoir, a trough, and an opening leading from one to the other, the process of filling the inkstand with ink being effected through the trough and the opening. This, however, could not be conveniently effected with the poultry drinking fountain, provided with a trough to extend entirely around its reservoir. Therefore, to enable the fountain to be filled to advantage, I make it with a flat top, as shown at $f$, and with a hole, $e$, through its bottom, the flat top being to enable the fountain, when inverted, to be supported in a horizontal position or thereabouts on the ground or table by resting on such flat top. And I also make the fountain with the recess $d$, for the purpose or objects hereinbefore described.

The whole article I usually construct in one piece, moulded in porcelain or clay, and afterwards indurated by heat; or it may be made of metal or other suitable material. I prefer what is termed the "stone-ware."

I do not, therefore, claim the principle of the "barometer inkstand," so far as it constitutes part of my drinking-fountain.

I claim as my invention or improvement in the above-described poultry drinking-fountain—

The combination and arrangement of the filling opening $e$ and the recess $d$ with the reservoir B and the trough A, such reservoir being provided with a discharge opening, $b$, arranged as specified.

I also claim the construction of the poultry drinking-fountain with the flat top to the reservoir, in combination with the filling orifice $e$, or the same and the recess $d$, arranged in its bottom, as set forth.

GEO. H. LOMAX.

Witnesses:
F. P. HALE, Jr.
J. R. SNOW.